US010726396B2

(12) United States Patent
Brandenburg et al.

(10) Patent No.: US 10,726,396 B2
(45) Date of Patent: * Jul. 28, 2020

(54) EVENT SCHEDULING

(71) Applicant: MINDBODY, INC., San Luis Obispo, CA (US)

(72) Inventors: Chet I. Brandenburg, Pismo Beach, CA (US); Christopher Abraham Smeder, San Luis Obispo, CA (US); Elizabeth Leibovich, San Luis Obispo, CA (US); Kristi Nunes, San Luis Obispo, CA (US); Kathryn Christman, Atascadero, CA (US); Alexander Kim, San Luis Obispo, CA (US); Danielle Murphy, Cayucos, CA (US); Amaya Becvar Weddle, San Luis Obispo, CA (US)

(73) Assignee: MINDBODY, INC., San Luis Obispo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,967

(22) Filed: Mar. 11, 2019

(65) Prior Publication Data

US 2019/0228382 A1 Jul. 25, 2019

Related U.S. Application Data

(63) Continuation of application No. 15/079,986, filed on Mar. 24, 2016, now Pat. No. 10,346,810.
(Continued)

(51) Int. Cl.
*G06F 3/0482* (2013.01)
*G06Q 10/06* (2012.01)
(Continued)

(52) U.S. Cl.
CPC .................. *G06Q 10/1095* (2013.01)

(58) Field of Classification Search
None
See application file for complete search history.

(56) References Cited

U.S. PATENT DOCUMENTS 5,111,391 A 5/1992 Fields et al.
5,117,353 A 5/1992 Stipanovich et al.
(Continued)

OTHER PUBLICATIONS

"U.S. Appl. No. 15/079,986, Advisory Action dated Dec. 4, 2018", 3 pgs.
(Continued)

*Primary Examiner* — Yongjia Pan
(74) *Attorney, Agent, or Firm* — Schwegman Lundberg & Woessner, P.A.

(57) ABSTRACT

In some examples, an apparatus for scheduling service assets for an event is provided. A schedule of events and service assets is stored. Each event in the schedule of events is associated with one of the plurality of service assets. A first service asset is unable to attend an event. A substitution request from a first computing device associated with the first service asset is received. A user interface is generated for display on the first computing device. The user interface includes a plurality of selectable items corresponding to the plurality of service assets, a selectable request-substitute interface element, and a selectable event sign-in interface element. In response to receiving a selection of a send-request interface element, a substitute request notification to be displayed on a second computing device is transmitted. In some examples, the schedule of events is updated to reflect a second service asset associated with the event.

15 Claims, 11 Drawing Sheets

Related U.S. Application Data

(60) Provisional application No. 62/137,568, filed on Mar. 24, 2015.

(51) Int. Cl.
*G06Q 10/10* (2012.01)
*G06F 3/0484* (2013.01)

(56) References Cited

U.S. PATENT DOCUMENTS

| | | |
|---|---|---|
| 5,164,897 A | 11/1992 | Clark et al. |
| 5,911,134 A | 6/1999 | Castonguay |
| 6,289,340 B1 | 9/2001 | Puram et al. |
| 6,334,133 B1 | 12/2001 | Thompson et al. |
| 6,675,151 B1 | 1/2004 | Thompson et al. |
| 8,321,254 B2 | 11/2012 | Bernasconi et al. |
| 8,751,334 B2 | 6/2014 | Wijaya et al. |
| 8,781,873 B2 | 7/2014 | Purohit et al. |
| 8,788,308 B1 | 7/2014 | Cox et al. |
| 10,346,810 B2 | 7/2019 | Brandenburg et al. |
| 2002/0029160 A1 | 3/2002 | Thompson |
| 2004/0225550 A1 | 11/2004 | Helander et al. |
| 2005/0055256 A1 | 3/2005 | Scott |
| 2005/0102245 A1 | 5/2005 | Edlund et al. |
| 2005/0114195 A1 | 5/2005 | Bernasconi |
| 2005/0288987 A1 | 12/2005 | Sattler et al. |
| 2007/0179830 A1 | 8/2007 | Iknoian |
| 2008/0059278 A1 | 3/2008 | Medina et al. |
| 2009/0099899 A1 | 4/2009 | Thompson et al. |
| 2009/0177535 A1 | 7/2009 | Vogt et al. |
| 2009/0319926 A1 | 12/2009 | Chakra et al. |
| 2010/0174575 A1 | 7/2010 | Farrell et al. |
| 2011/0231216 A1 | 9/2011 | Fyke et al. |
| 2012/0123956 A1 | 5/2012 | Chenthamarakshan et al. |
| 2013/0018690 A1 | 1/2013 | Weinberg, Jr. |
| 2014/0013252 A1 | 1/2014 | Ehrler et al. |
| 2015/0142493 A1 | 5/2015 | Lakritz et al. |
| 2015/0248649 A1 | 9/2015 | Avats |
| 2016/0283057 A1 | 9/2016 | Brandenburg et al. |
| 2017/0243152 A1 | 8/2017 | Thomson et al. |

OTHER PUBLICATIONS

"U.S. Appl. No. 15/079,986, Final Office Action dated Oct. 26, 2018", 13 pgs.

"U.S. Appl. No. 15/079,986, Non Final Office Action dated Jan. 11, 2019", 7 pgs.

"U.S. Appl. No. 15/079,986, Non Final Office Action dated Apr. 5, 2018", 12 pgs.

"U.S. Appl. No. 15/079,986, Notice of Allowance dated Feb. 21, 2019", 8 pgs.

"U.S. Appl. No. 15/079,986, Response filed Jul. 5, 2018 to Non Final Office Action dated Apr. 5, 2018", 19 pgs.

"U.S. Appl. No. 15/079,986, Response filed Nov. 20, 2018 to Final Office Action dated Oct. 26, 2018", 15 pgs.

"U.S. Appl. No. 15/079,986, Response to Non Final Office Action dated Jan. 11, 2019", 11 pgs.

U.S. Appl. No. 15/079,986, filed Mar. 24, 2016, Event Scheduling.

EVENT SCHEDULING

CROSS-REFERENCE TO RELATED APPLICATIONS

This application is a continuation of, and claims the benefit of priority to U.S. patent application Ser. No. 15/079,986, entitled EVENT SCHEDULING, inventors Chet I. Brandenburg et al., filed on Mar. 24, 2016, which claims the benefit of priority, under 35 U.S.C. Section 119(e), to U.S. Provisional Patent Application Ser. No. 62/137,568, entitled CLASS SCHEDULING WITH INSTRUCTOR SUBSTITUTION, inventors Chet I. Brandenburg et al., filed on Mar. 24, 2015, which are each herein incorporated by reference in their entireties.

BACKGROUND

The present subject matter seeks to address technical problems in the area of event scheduling, and provide intelligent user systems and interfaces to facilitate scheduling and inventory management.

BRIEF SUMMARY

In one example embodiment, a portable electronic user device is provided. The device may comprise a touch-sensitive display, the touch-sensitive display configured to separately display a plurality of hierarchically ordered user interface screens within a single application, the hierarchically ordered user interface screens including a first predefined user interface screen and a second predefined user interface screen with one or more user interface screens in the hierarchically ordered user interface screens in a plurality of user selectable paths between the first predefined user interface screen and the second predefined user interface screen; one or more processors; memory; and one or more programs, wherein the one or more programs are stored in the memory and configured to be executed by the one or more processors, the one or more programs including instructions for: displaying a third user interface screen in the plurality of user interface screens, the third user interface screen belonging to a selected path in the hierarchically ordered user interface screens and being between the first predefined user interface screen and the second predefined user interface screen; the third user interface screen displaying a pool of selectable service assets for leading an event; detecting a finger gesture on the touch-sensitive display while displaying the third user interface screen, the finger gesture indicative of a user selection of a first service asset in the pool of selectable service assets; in response to detecting the finger gesture on the touch sensitive display, sending a first substitute request notification to a device associated with the first service asset: in response to receiving, from the device associated with the first service asset, a positive response to the substitute request notification, substituting the first service asset for an existing service asset associated with the event, and notifying the pool of selectable service assets and the existing service asset of the substitution.

The existing service asset may be the user. Further, in response to receiving a negative response to the first substitute request notification, a second substitute request notification may be sent to a device associated with a second service asset in the pool of selectable service assets, and in response to receiving, from the device associated with the second service asset, a positive response to the second substitute request notification, the second service asset may be substituted for the existing service asset associated with the event.

In one example, the second service asset is selected, by the user, to receive the second substitute request notification in response to receipt of the negative response to the first substitute request notification.

In another example, the pool of selectable service assets is a ranked pool of selectable service assets and the second service asset is selected automatically, based on rank, to receive the second substitute request notification in response to receipt of the negative response to the first substitute request notification.

In another example, the second service asset is substituted for the existing service asset associated with the event based on a timing of receipt of the positive response to the second substitute request notification.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
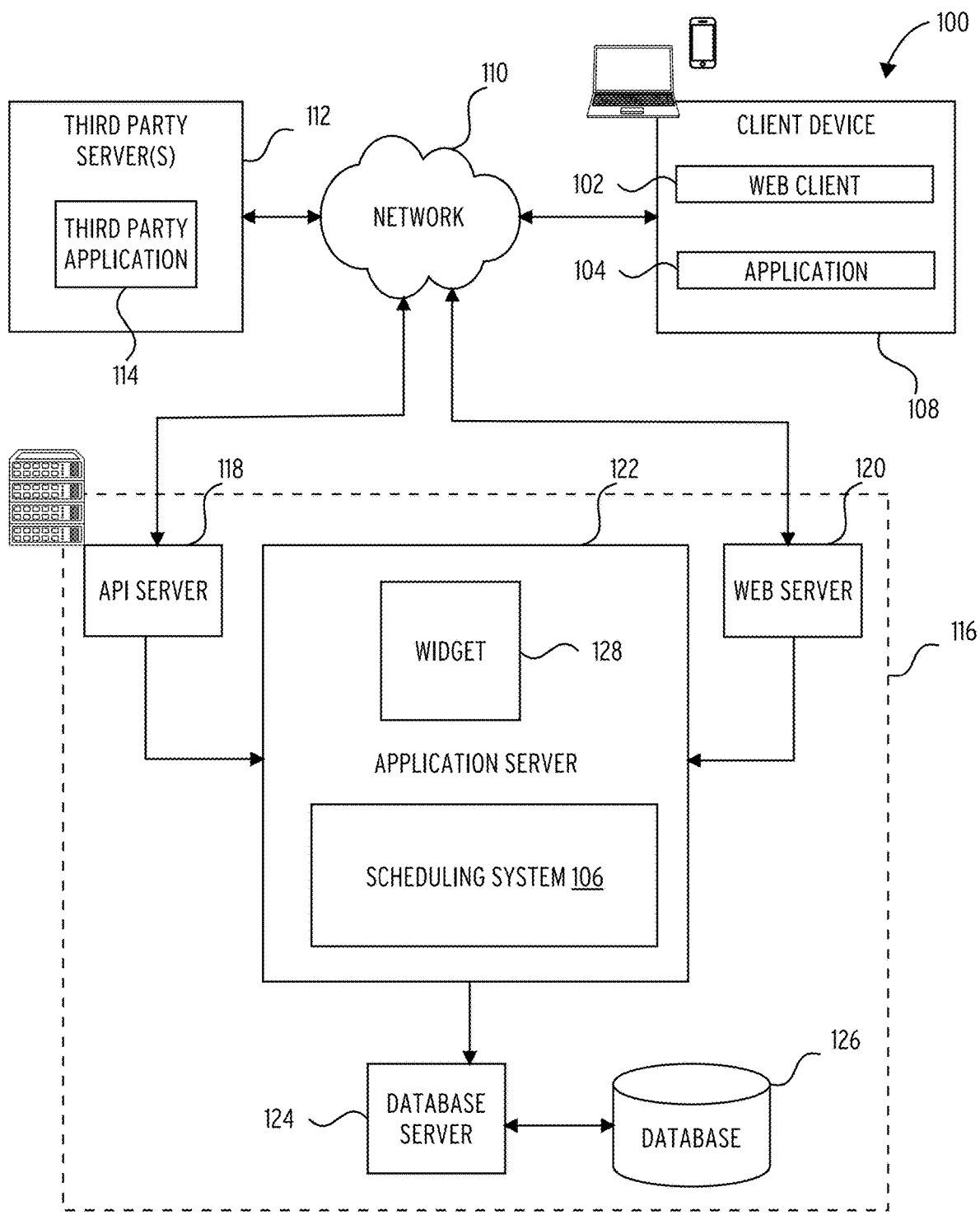
FIG. 1 is a block diagram illustrating a networked system, according to some example embodiments.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"MODULE" in this context refers to logic having boundaries defined by function or subroutine calls, branch points, application program interfaces (APIs), or other technologies that provide for the partitioning or modularization of particular processing or control functions. Modules are typically combined via their interfaces with other modules to carry out a machine process. A module may be a packaged functional hardware unit designed for use with other components and a part of a program that usually performs a particular function of related functions. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" (or "hardware-implemented module") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors. Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. ?A processor ma, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Description

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2016, MINDBODY, INC., All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Drawings

With reference to FIG. 1, an example embodiment of a high-level SaaS network architecture 100 is shown. A networked system 116 provides server-side functionality via a network 110 (e.g., the Internet or wide area network (WAN)) to a client device 108. A web client 102 and a programmatic client, in the example form of an application 104 are hosted and execute on the client device 108. The networked system 116 includes and application server 122, which in turn hosts a scheduling system 106 that provides a number of functions and services to the application 104 that accesses the networked system 116. The application 104 also provides a number of interfaces described herein, which present output of the tracking and analysis operations to a user of the client device 108.

The client device 108 enables a user to access and interact with the networked system 116. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An Application Program Interface (API) server 118 and a web server 120 are coupled to, and provide programmatic and web interfaces respectively, to the application server 122. The application server 122 hosts a scheduling system 106, which includes modules or applications. The application server 122 is, in turn, shown to be coupled to a database server 124 that facilitates access to information storage repositories (e.g., a database 126). In an example embodiment, the database 126 includes storage devices that store information accessed and generated by the scheduling system 106.

Additionally, a third party application 114, executing on a third party server 112, is shown as having programmatic access to the networked system 116 via the programmatic interface provided by the Application Program Interface (API) server 118. For example, the third party application 114, using information retrieved from the networked system 116, may support one or more features or functions on a website hosted by the third party.

Turning now specifically to the applications hosted by the client device 108, the web client 102 may access the various systems (e.g., scheduling system 106) via the web interface supported by the web server 120. Similarly, the application 104 (e.g., an "app") accesses the various services and functions provided by the scheduling system 106 via the programmatic interface provided by the Application Program Interface (API) server 118. The application 104 may, for example, an "app" executing on a client device 108, such as an iOS or Android OS application to enable user to access and input data on the networked system 116 in an off-line manner, and to perform batch-mode communications between the programmatic client application 104 and the networked system networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The scheduling system 106 could also be implemented as a standalone software program, which do not necessarily have networking capabilities.

Figure 2:
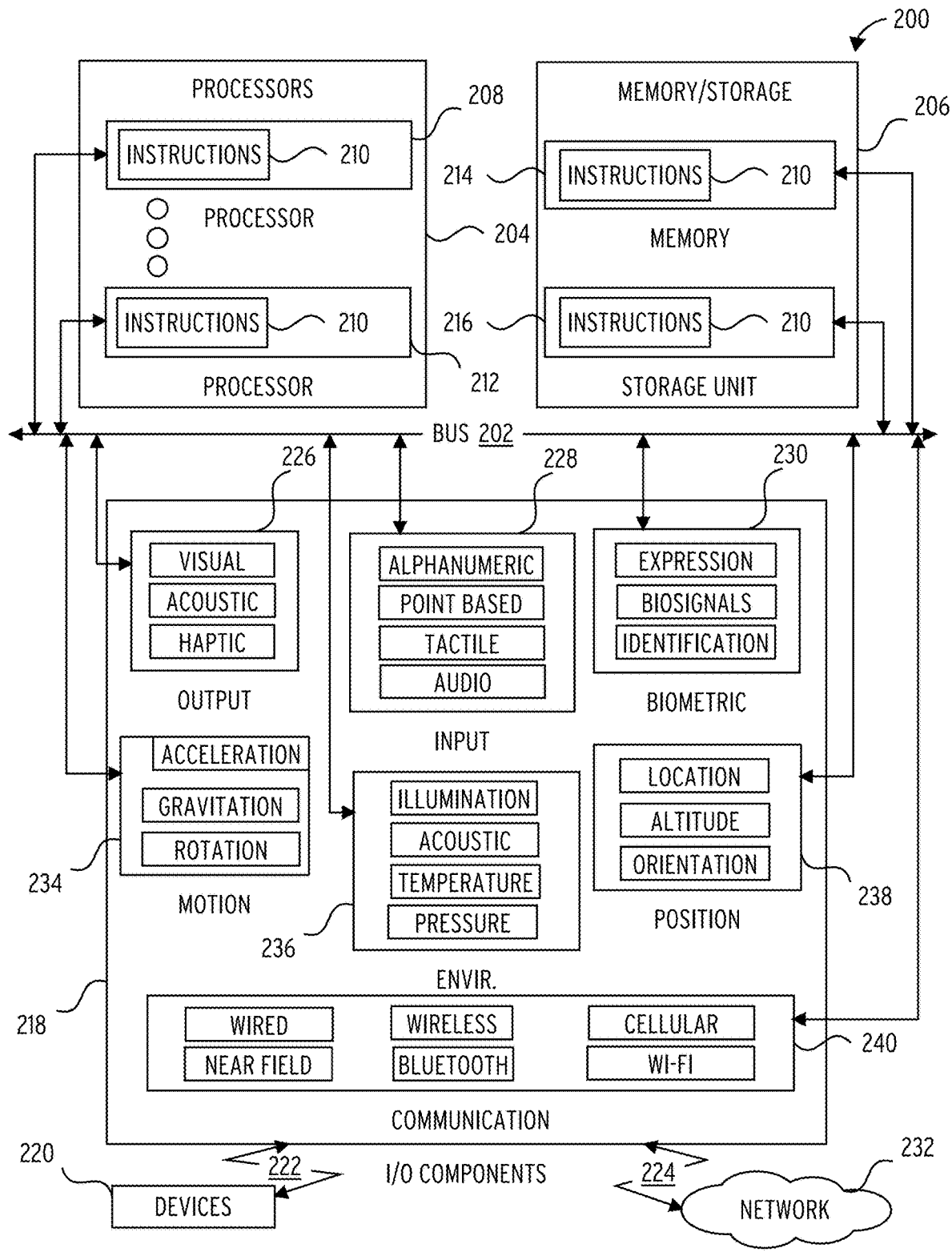
FIG. 2 is a block diagram illustrating components of a machine, according to some example embodiments, able to read instructions from a machine-readable medium (e.g., a machine-readable storage medium) and perform any one or more of the methodologies discussed herein.

FIG. 2 is a block diagram illustrating components of a machine 200, according to some example embodiments, able to read instructions from a machine-readable medium (e.g., a machine-readable storage medium) and perform any one or more of the methodologies discussed herein. Specifically, FIG. 2 shows a diagrammatic representation of the machine 200 in the example form of a computer system, within which instructions 210 (e.g., software, a program, an application, an applet, an app, or other executable code) for causing the machine 200 to perform any one or more of the methodologies discussed herein may be executed. As such, the instructions may be used to implement modules or components described herein. The instructions transform the general, non-programmed machine into a particular machine programmed to carry out the described and illustrated functions in the manner described. In alternative embodiments, the machine 200 operates as a standalone device or may be coupled (e.g., networked) to other machines. In a networked deployment, the machine 200 may operate in the capacity of a server machine or a client machine in a server-client network environment, or as a peer machine in a peer-to-peer (or distributed) network environment. The machine 200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 210, sequentially or otherwise, that specify actions to be taken by machine 200. Further, while only a single machine 200 is illustrated, the term "machine" shall also be taken to include a collection of machines that individually or jointly execute the instructions 210 to perform any one or more of the methodologies discussed herein.

The machine 200 may include processors 204, memory memory/storage 206, and I/O components 218, which may be configured to communicate with each other such as via a bus 202. The memory/storage 206 may include a memory 214, such as a main memory, or other memory storage, and a storage unit 216, both accessible to the processors 204 such as via the bus 202. The storage unit 216 and memory 214 store the instructions 210 embodying any one or more of the methodologies or functions described herein. The instructions 210 may also reside, completely or partially, within the memory 214, within the storage unit 216, within at least one of the processors 204 (e.g., within the processor's cache memory), or any suitable combination thereof, during execution thereof by the machine 200. Accordingly, the memory 214, the storage unit 216, and the memory of processors 204 are examples of machine-readable media.

The I/O components 218 may include a wide variety of components to receive input, provide output, produce output, transmit information, exchange information, capture measurements, and so on. The specific I/O components 218 that are included in a particular machine will depend on the type of machine. For example, portable machines such as mobile phones will likely include a touch input device or other such input mechanisms, while a headless server machine will likely not include such a touch input device. It will be appreciated that the I/O components 218 may include many other components that are not shown in FIG. 2. The I/O components 218 are grouped according to functionality merely for simplifying the following discussion and the grouping is in no way limiting. In various example embodiments, the I/O components 218 may include output components output components 226 and input components 228. The output components 226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 218 may include biometric components 230, motion components 234, environmental environment components 236, or position components 238 among a wide array of other components. For example, the biometric components 230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 234 may include acceleration sensor components (e.g., accelerometer), gravitation sensor components, rotation sensor components (e.g., gyroscope), and so forth. The environment components 236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 238 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 218 may include communication components 240 operable to couple the machine 200 to a network 232 or devices 220 via coupling 222 and coupling 224 respectively. For example, the communication components 240 may include a network interface component or other suitable device to interface with the network 232. In further examples, communication components 240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 220 may be another machine or any of a wide variety of peripheral devices (e.g., a peripheral device coupled via a Universal Serial Bus (USB)).

Moreover, the communication components 240 may detect identifiers or include components operable to detect identifiers. For example, the communication components processors communication components 240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 240, such as, location via Internet Protocol (IP) geo-location, location via Wi-Fi® signal triangulation, location via detecting a NFC beacon signal that may indicate a particular location, and so forth.

Software Architecture

Figure 3:
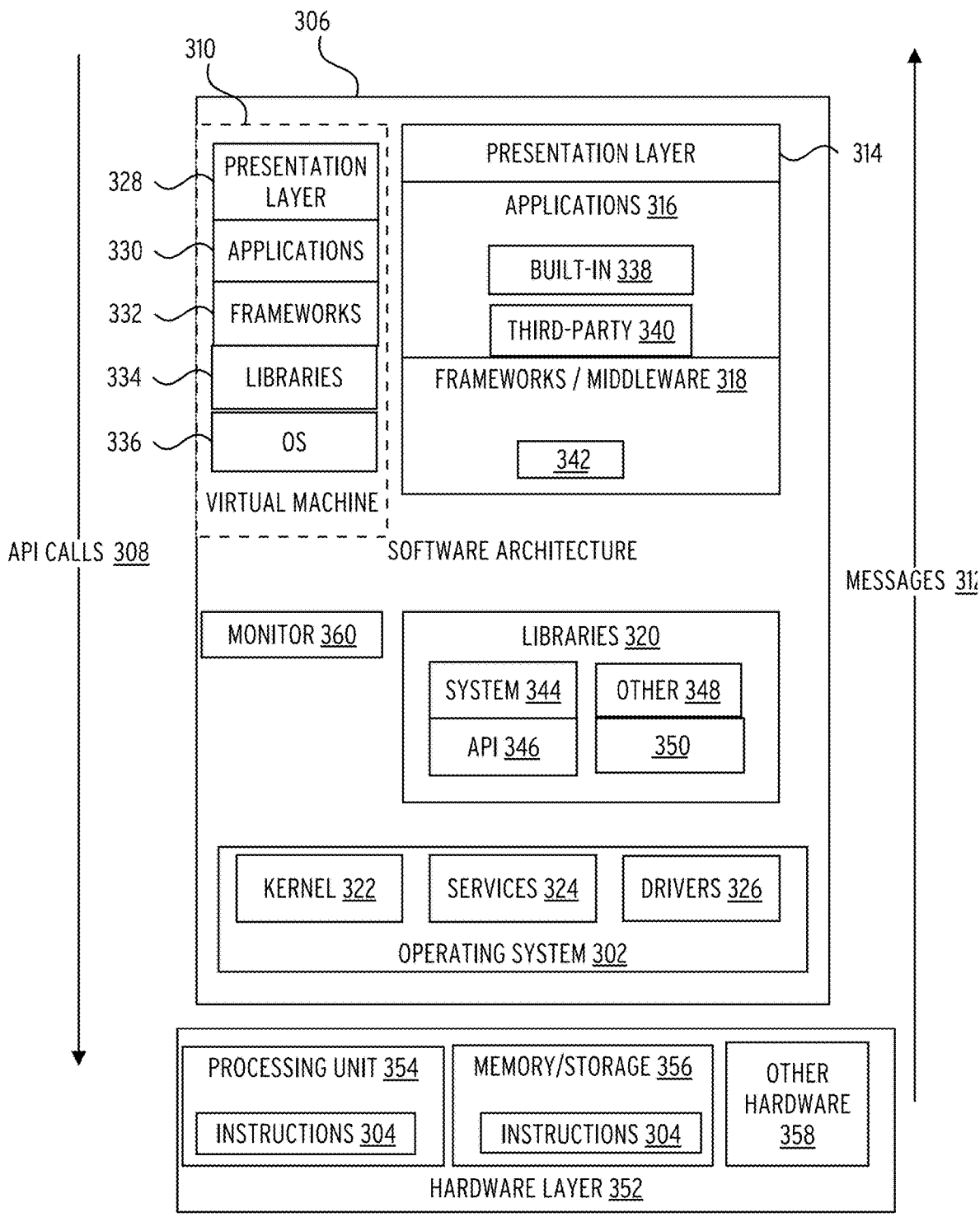
FIG. 3 is a block diagram illustrating a representative software architecture software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture and it will be appreciated that many other architectures may be implemented to facilitate the functionality described herein. The software architecture 306 may execute on hardware such as machine 200 of FIG. 2 that includes, among other things, processors 204, memory 214, and I/O components 218. A representative hardware layer 352 is illustrated and can represent, for example, the machine 200 of FIG. 2. The representative hardware layer 352 includes a processing unit 354 having associated executable instructions 304. Executable instructions 304 represent the executable instructions of the software architecture 306, including implementation of the methods, modules and so forth described herein. The hardware layer 352 also includes memory and/or storage modules memory/storage 356, which also have executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, applications 316 and a presentation layer 314. Operationally, the applications 316 and/or other components within the layers may invoke application programming interface (API) API calls 308 through the software stack and receive a response as in response to the API calls 308. The layers illustrated are representative in nature and not all software architectures have all layers. For example, some mobile or special purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324 and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than to interface directly with the underlying operating system 302 functionality (e.g., kernel 322, services 324 and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks frameworks/middleware 318 (also sometimes referred to as middleware) provide a higher-level common infrastructure that may be used by the applications 316 and/or other software components/modules. For example, the frameworks/middleware 318 may provide various graphic user interface (GUI) functions, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. Third-party applications 340 may include any an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 340 may invoke the API calls 308 provided by the mobile operating system (such as operating system 302) to facilitate functionality described herein.

The applications 316 may use built in operating system functions (e.g., kernel 322, services 324 and/or drivers 326), libraries 320, and frameworks/middleware 318 to create user interfaces to interact with users of the system. Alternatively, or additionally, in some systems interactions with a user may occur through a presentation layer, such as presentation layer 314. In these systems, the application/module "logic" can be separated from the aspects of the application/module that interact with a user.

Some software architectures use virtual machines. In the example of FIG. 3, this is illustrated by a virtual machine 310. The virtual machine 310 creates a software environment where applications/modules can execute as if they were executing on a hardware machine (such as the machine 200 of FIG. 2, for example). The virtual machine 310 is hosted by a host operating system (operating system (OS) 336 in FIG. 3) and typically, although not always, has a virtual machine monitor 360, which manages the operation of the virtual machine as well as the interface with the host operating system (i.e., operating system 302). A software architecture executes within the virtual machine 310 such as an operating system operating system (OS) 336, libraries 334, frameworks 332, applications 330 and/or presentation layer 328. These layers of software architecture executing within the virtual machine 310 can be the same as corresponding layers previously described or may be different.

In one aspect of the present disclosure, a class scheduling tool is provided. The tool includes one or more interactive graphical user interfaces (GUI's) which allow human/machine interaction. Reference is made to FIGS. 4-11 in this regard. In each example, the graphical user interface (GUI) is designated generally by the numeral 400, 500 and so forth.

In the descriptions that follow, reference is variously made to a "user". This term is intended to be a reference without limitation to a wellness provider or, for example, a human operator or receptionist employee utilizing the tool, an employer such as a corporation or, for example, an HR administrator utilizing the tool, a consumer of wellness services for example, a company, an individual or other entity, and a health insurance company or, for example, an insurance agent employee utilizing the tool. Other users are possible.

In the following description, the example GUI's are touch sensitive. They need not be. In the present examples, slide-based or touch-based user navigation actions such as "swipes", "scrolls" and "taps" can cause the performance of operations within a processor or machine, such as the scheduling system 106 or client device 108 with which the GUI is associated or connected locally or remotely. Other GUI's with clickable links or scrolling bars, for example, are possible. Finger-, mouse-, and pointer-based navigation is possible.

Reference is now made to FIGS. 4-11 which show views of graphical user interfaces for a class (also termed an event herein) scheduling tool having instructor substitution functionality, according to example embodiments. In some examples, a scheduling tool including the instructor substitution functionality is provided in an application ("app") which can be downloaded to a smart device (portable electronic device, wearable device, smart watch, PDA, etc.).

Finding a substitute instructor (also termed a teacher or service asset herein) to teach a scheduled class can be a significant inconvenience, especially if a teacher suddenly becomes unavailable shortly before commencement of a class. The inventors have created a scheduling tool which allows teachers (or other users) to send substitute request notifications to other teachers and have them accept or deny these requests. An acceptance updates a schedule in the app which is visible in the GUI of the original teacher's or substitute teacher's portable electronic device, such as the client device 108.

In another example, a user is able to click or tap in a GUI to navigate into details of a scheduled class, and choose to submit a teacher substitution request. The user can choose which teacher they would like to push this request to. Once the request has been sent, all recipients will receive a notification, for example a push notification on their own client device 108. When a recipient user opens this push notification, the message allows the recipient user to read additional details of the scheduled class and will further allow the recipient user to accept or deny the request. If a recipient user is the first to accept a request, that user will receive confirmation that they are now scheduled to teach that class. If that user denies the request, the notification disappears, allowing other teachers to accept. The request automatically "cascades" in this way until a replacement teacher is found, or the teacher pool is exhausted.

Figure 4:
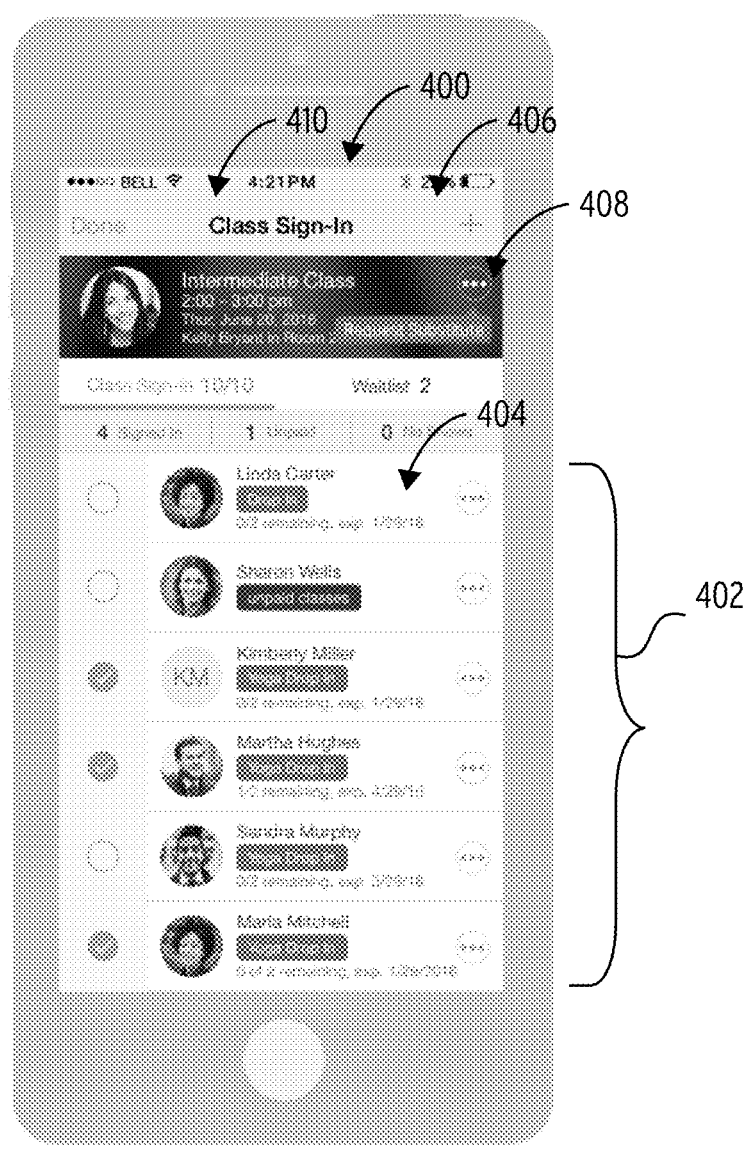
FIG. 4 illustrates an aspect of the subject matter in accordance with one embodiment.

The GUI 400 in FIG. 4 shows a list of classes 402 with associated class details 404 given for each one. A user can navigate (e.g. by click or tap) down the list of classes 402 to select a class. Further details of a selected class appear in an upper window 406 of the GUI 400 in which a "request substitute" interface action element 408 is visible. The upper window 406 also includes a "class sign-in" interface action element 410 allowing a user to sign up for the class listed in window 406. Further class details may be provided in window 406 to assist in making a choice of class.

Figure 5:
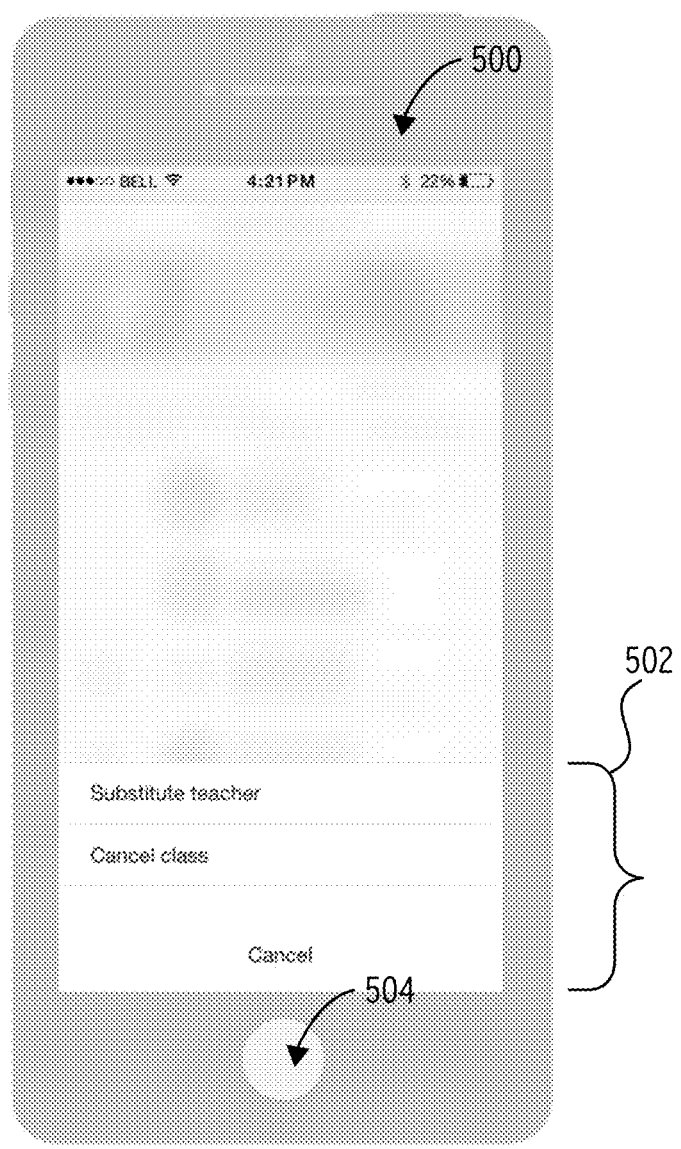
FIG. 5 illustrates an aspect of the subject matter in accordance with one embodiment.

Activation of the "request substitute" element 408 prompts the view in FIG. 5 to be displayed. In this GUI view 500, a portion of the display is grey-out in the interest of simplicity of explanation. A user-selection menu element 502 appears in a lower portion of GUI 500 and a user (typically the class teacher) can select an option, as shown, to substitute the class teacher, or cancel the class entirely. Any selection can be canceled using "cancel" action element 504. The substitute selection applies to the class selected in window 406 of GUI 400, shown again in FIG. 6.

Figure 6:
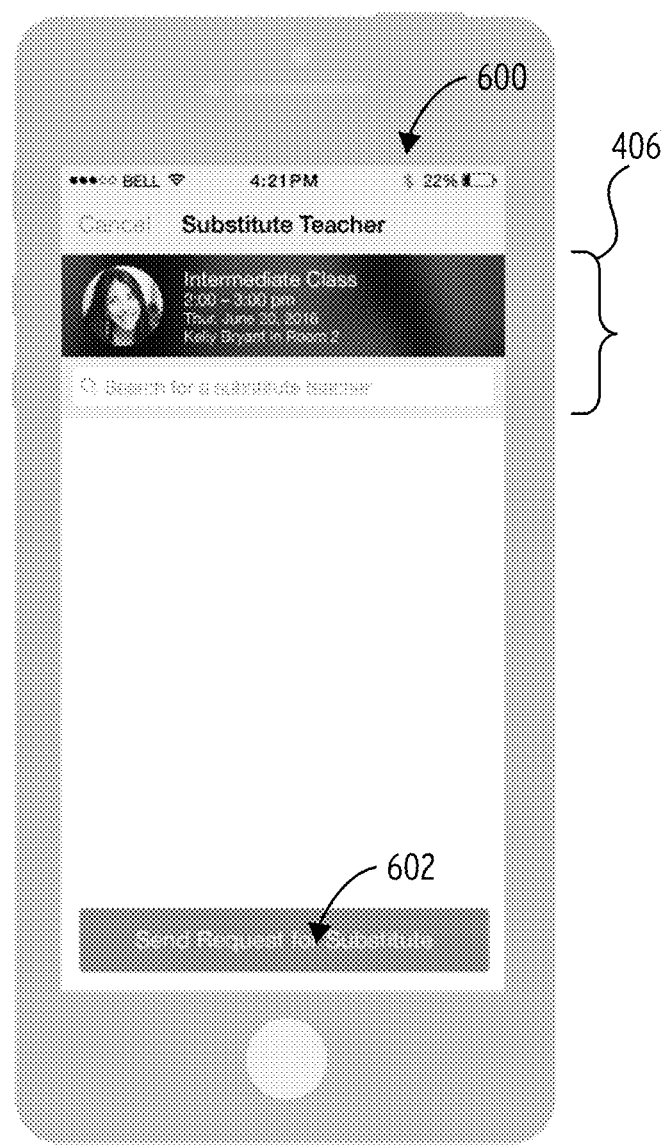
FIG. 6 illustrates an aspect of the subject matter in accordance with one embodiment.

In the GUI 600 shown FIG. 6, the user is provided an action element 602 for sending a request for a teacher to substitute in for the selected class (e.g. the class shown in window 406).

Figure 7:
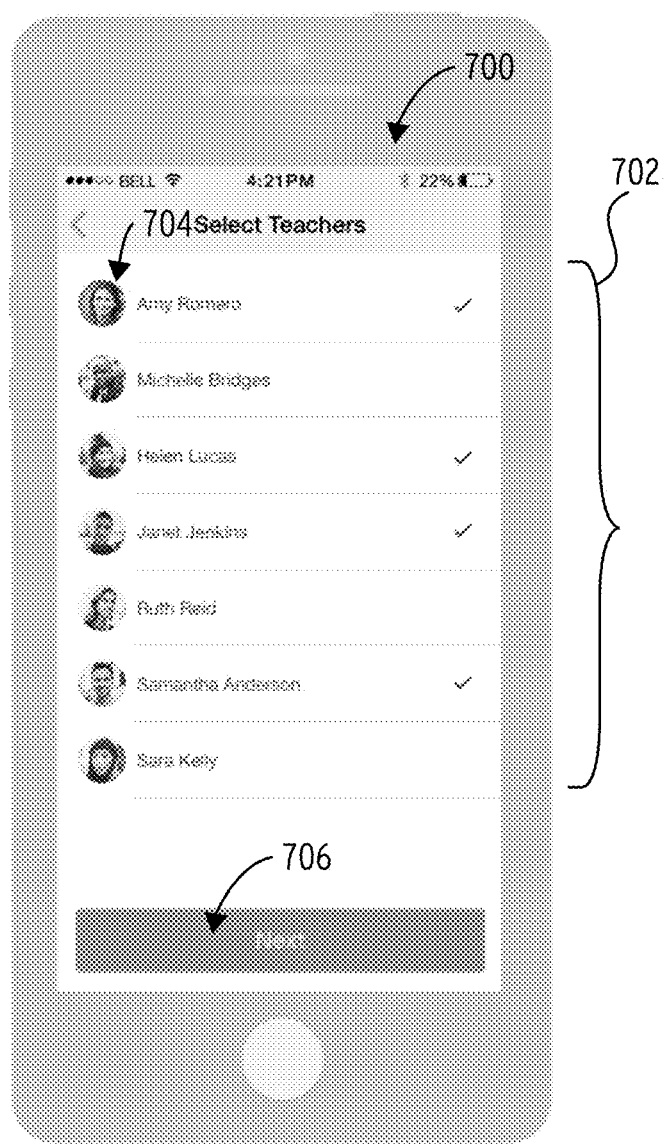
FIG. 7 illustrates an aspect of the subject matter in accordance with one embodiment.

The user can click or tap on the action element 602 and be provided, in the GUI 700 of FIG. 7, a list 702 of the names of identified available substitute teachers. Each teacher name appears in an item 704. The user can select any combination of teachers that the user would like to send a substitute request notification to. In the illustrated case, four of seven teachers are selected for receipt of the substitute request notification. Once the desired recipient group is identified as shown by the check marks, the user navigates to the next user interface 800 using action element 706.

Figure 8:
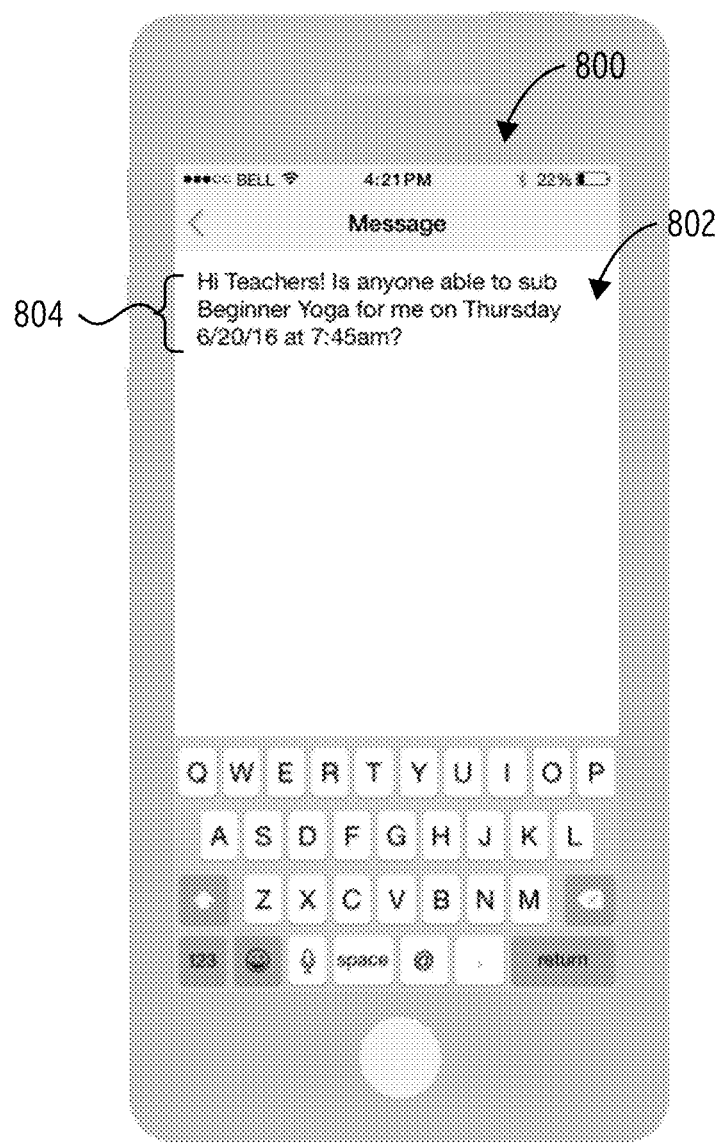
FIG. 8 illustrates an aspect of the subject matter in accordance with one embodiment.

In FIG. 8, a message composition window 802 in the GUI 800 allows the user to compose a notification message 804 to the selected pool of potential replacement teachers. Once the notification message 804 is sent to the pool, each potential substitute teacher receives in turn a push notification on their own respective client device 108.

Figure 9:
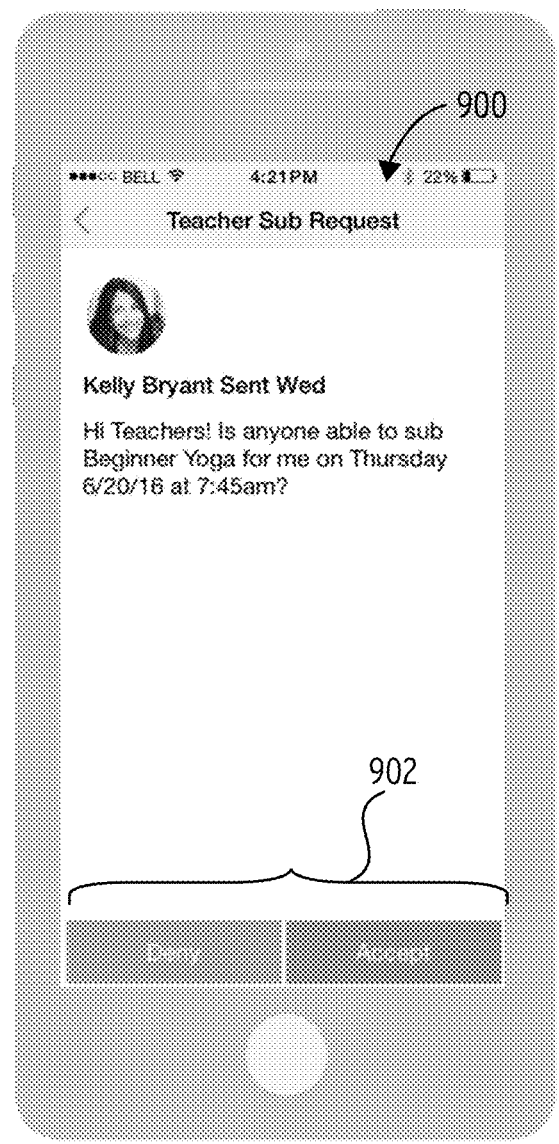
FIG. 9 illustrates an aspect of the subject matter in accordance with one embodiment.

An example view of such a push notification is given FIG. 9. When a teacher in the pool receives or accepts the notification message 804 including the substitute request, an application on that recipient user's device launches and brings up into view in the GUI 900 the previously composed message. Action elements 902 (Accept/Deny) in the allow the message recipient to send a reply notification accepting or denying the request for substitution. If the recipient user accepts the request, a class record available to all users is updated with the relevant information. In other words, details of the class which originally appeared in window 406 are updated to reflect details of the new class teacher.

If a recipient user is the first to accept a request, that user will receive confirmation that they are now scheduled to teach that class. If that user denies the request, the notification disappears, allowing other teachers to accept. The request automatically "cascades" in this way until a replacement teacher is found, or the teacher pool is exhausted.

Figure 10:
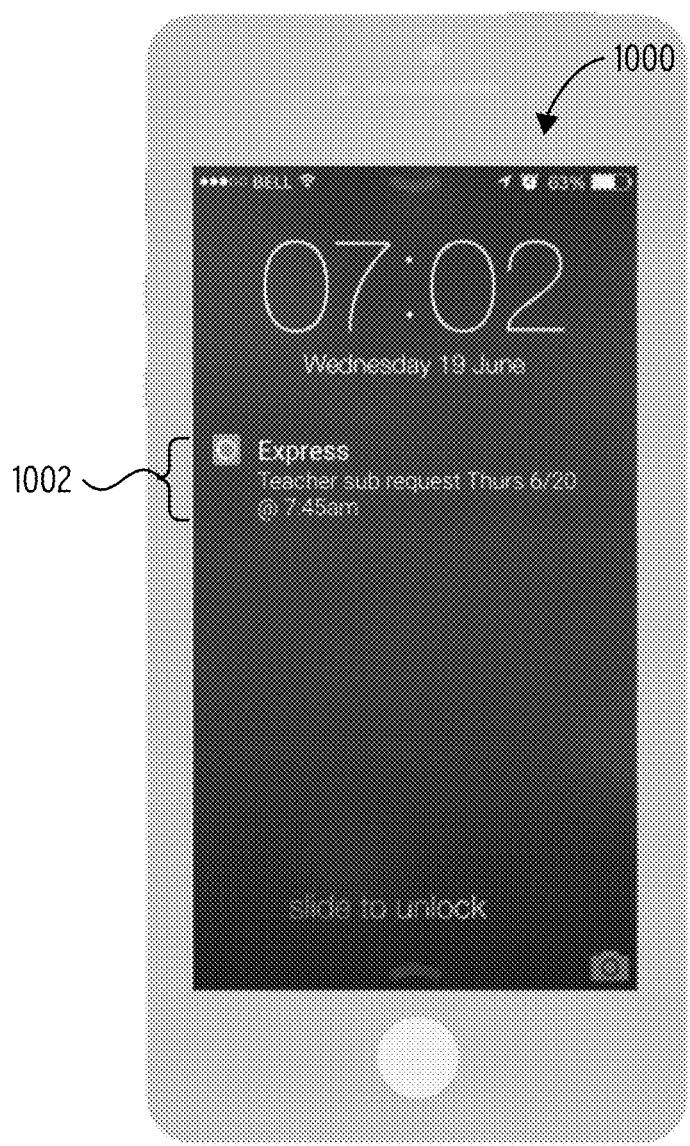
FIG. 10 illustrates an aspect of the subject matter in accordance with one embodiment.

In the GUI 1000 of FIG. 10, a reply push notification 1002 sent to the original teacher lets them know that a substitute teacher has been confirmed.

Figure 11:
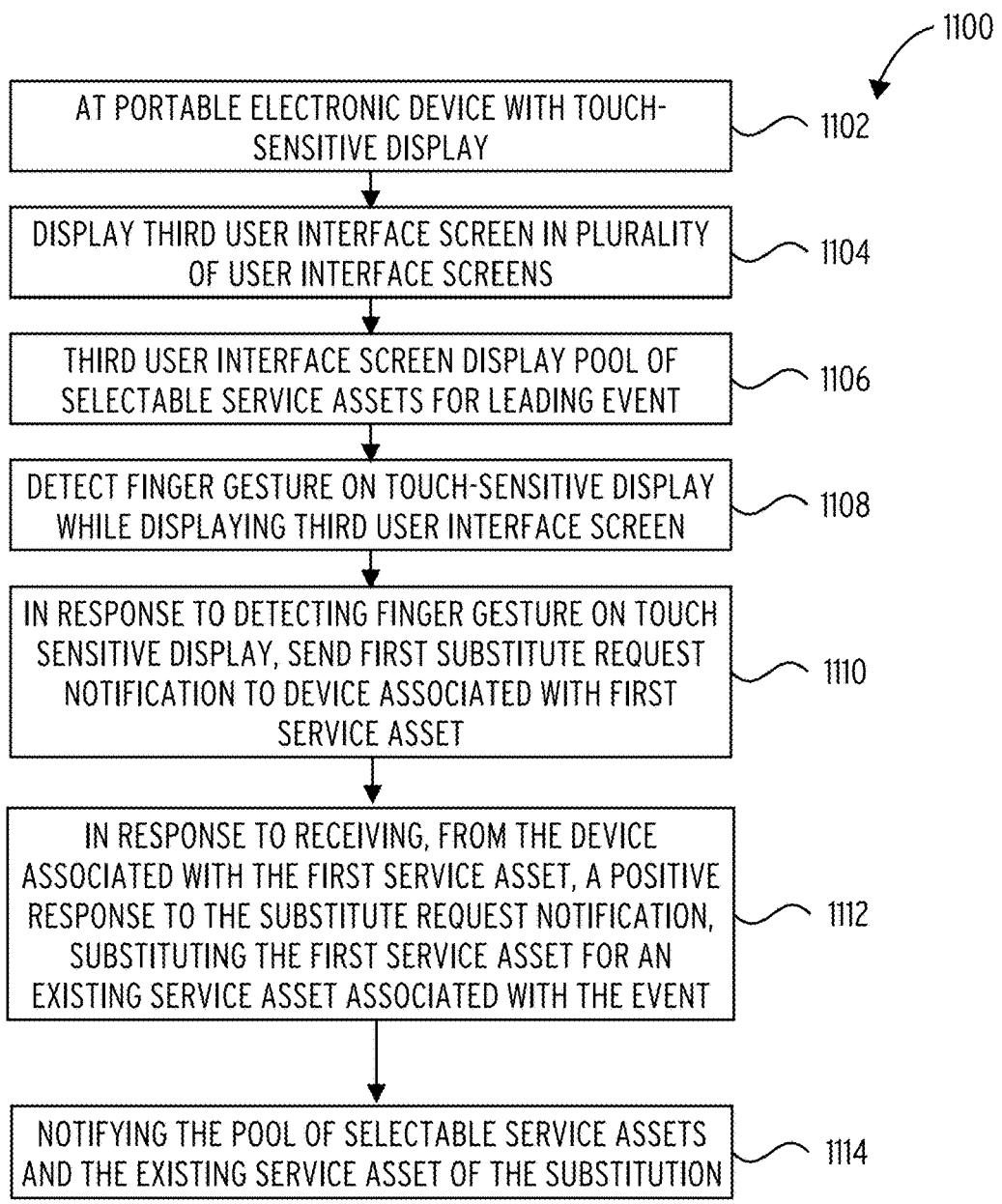
FIG. 11 illustrates a method in accordance with one embodiment.

Some embodiments of the present inventive subject matter include methods for scheduling service assets for an event. A flow diagram for one such embodiment is illustrated in FIG. 11. In block 1102, a method 1100 is performed at a portable electronic device with a touch-sensitive display. The touch-sensitive display may be configured to separately display a plurality of hierarchically ordered user interface screens within a single application, the hierarchically ordered user interface screens including a first predefined user interface screen and a second predefined user interface screen with one or more user interface screens in the hierarchically ordered user interface screens in a plurality of user selectable paths between the first predefined user interface screen and the second predefined user interface screen. In block 1104, method 1100 includes displaying a third user interface screen in the plurality of user interface screens. In block 1106, method 1100 includes displaying on the third user interface screen a pool of selectable service assets for leading the event. In block 1108, method 1100 includes detecting a finger gesture on the touch-sensitive display while displaying the third user interface screen. In block 1110, method 1100 includes, in response to detecting the finger gesture on the touch sensitive display, sending a first substitute request notification to a device associated with the first service asset. In block 1112, method 1100 includes, in response to receiving from the device associated with the first service asset, a positive response to the substitute request notification, and substituting the first service asset for an existing service asset associated with the event. In block 1114, method 1100 includes notifying the pool of selectable service assets and the existing service asset of the substitution.

In an example embodiment, the existing service asset is the user. Further, in response to receiving a negative response to the first substitute request notification, method 1100 may include sending a second substitute request notification to a device associated with a second service asset in the pool of selectable service assets, and in response to receiving, from the device associated with the second service asset, a positive response to the second substitute request notification, substituting the second service asset for the existing service asset associated with the event.

In an example embodiment, the second service asset is selected, by the user, to receive the second substitute request notification in response to receipt of the negative response to the first substitute request notification.

In another example embodiment, the pool of selectable service assets is a ranked pool of selectable service assets and the second service asset is selected automatically, based on rank, to receive the second substitute request notification in response to receipt of the negative response to the first substitute request notification.

In another example embodiment, the second service asset is substituted for the existing service asset associated with the event based on a timing of receipt of the positive response to the second substitute request notification.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Description, with each claim standing on its own as a separate embodiment.

What is claimed is:

1. A method of scheduling service assets for an event, the method comprising:
   storing by a processor a schedule of events and a plurality of service assets in a database, wherein each event in the schedule of events is associated with one of the plurality of service assets, and wherein a first service asset is unable to attend the event;
   detecting by the processor a request from a first computing device associated with the first service asset, wherein the request includes an identification of a first event associated with the first service asset, wherein the first event is included in the schedule of events and the first service asset is included in the plurality of service assets;
   generating, by the processor, a user interface to be displayed on the first computing device, wherein the user interface includes, at least:
   a plurality of selectable items corresponding to the plurality of service assets, respectively,
   a selectable request-substitute interface element,
   a selectable event sign-in interface element;
   receiving, by the processor, first input selecting the request-substitute interface element on the user interface displayed on the first computing device, wherein the first input includes selection of a first selectable item in the plurality of selectable items, and wherein the first selectable item is associated with a second service asset;
   in response to receiving the first input,
   generating a selectable send-request interface element to be displayed in the user interface of the first computing device;
   in response to receiving a selection of the send-request interface element, generating a first substitute request notification to be displayed on a second computing device, wherein the second computing device is associated with the second service asset;
   in response to receiving, from the second computing device, a first response to the first substitute request notification, updating the schedule of events in the database, wherein updating the schedule of events includes:
   substituting in the database the second service asset for the first service asset to associate the first event with the second service asset, and
   generating a second notification to be displayed on a plurality of computing devices, wherein the second notification includes the first event being associated with the second service asset.

2. The method of claim 1, further comprising:
   in response to receiving, from the second computing device, a second response to the first substitute request notification,
   generating, by the processor, the first substitute request notification to be displayed on a third computing device, wherein the third computing device is associated with a third service asset.

3. The method of claim 2, further comprising:
   in response to receiving, from the third computing device, a response to the first substitute request notification, updating the schedule of events in the database, wherein updating the schedule of events includes:
   substituting in the database the third service asset for the first service asset to associate the first event with the third service asset, and generating a third notification to be displayed on the plurality of computing devices, wherein the third notification includes the first event being associated with the third service asset.

4. The method of claim 3, wherein the plurality of selectable service assets is a ranked pool of selectable service assets and the second service asset is selected automatically, based on rank, to receive the first substitute request notification in response to receiving the second response to the first substitute request notification.

5. The method of claim 1,
   wherein the third service asset is substituted for the first service asset associated with the first event based on a timing of receipt of the first response to the first substitute request notification.

6. An apparatus for scheduling service assets for an event, the computing apparatus comprising:
   a processor; and
   a memory storing instructions that, when executed by the processor, cause the processor to perform operations comprising, at least:
   storing by the processor a schedule of events and a plurality of service assets in a database, wherein each event in the schedule of events is associated with one of the plurality of service assets, and wherein a first service asset is unable to attend the event;
   detecting by the processor a request from a first computing device associated with the first service asset, wherein the request includes an identification of a first event associated with the first service asset, wherein the first event is included in the schedule of events and the first service asset is included in the plurality of service assets;
   generating, by the processor, a user interface to be displayed on the first computing device, wherein the user interface includes, at least:
   a plurality of selectable items corresponding to the plurality of service assets, respectively,
   a selectable request-substitute interface element,
   a selectable event sign-in interface element;
   receiving, by the processor, first input selecting the request-substitute interface element on the user interface displayed on the first computing device, wherein the first input includes selection of a first selectable item in the plurality of selectable items, and wherein the first selectable item is associated with a second service asset;
   in response to receiving the first input,
   generating a selectable send-request interface element to be displayed in the user interface of the first computing device;
   in response to receiving a selection of the send-request interface element, generating a first substitute request notification to be displayed on a second computing device, wherein the second computing device is associated with the second service asset;
   in response to receiving, from the second computing device, a first response to the first substitute request notification, updating the schedule of events in the database, wherein updating the schedule of events includes:
   substituting in the database the second service asset for the first service asset to associate the first event with the second service asset, and
   generating a second notification to be displayed on a plurality of computing devices, wherein the second notification includes the first event being associated with the second service asset.

7. The apparatus of claim 6, wherein the processor is configured to perform operations further comprising:
   in response to receiving, from the second computing device, a second response to the first substitute request notification,
   generating the first substitute request notification to be displayed on a third computing device, wherein the third computing device is associated with a third service asset.

8. The apparatus of claim 7, wherein the processor is configured to perform operations further comprising:
   in response to receiving, from the third computing device, a response to the first substitute request notification, updating the schedule of events in the database, wherein updating the schedule of events includes:
   substituting in the database the third service asset for the first service asset to associate the first event with the third service asset, and generating a third notification to be displayed on the plurality of computing devices, wherein the third notification includes the first event being associated with the third service asset.

9. The apparatus of claim 6, wherein the plurality of selectable service assets is a ranked pool of selectable service assets and the second service asset is selected automatically, based on rank, to receive the first substitute request notification in response to receipt of the second response to the first substitute request notification.

10. The apparatus of claim 7, wherein the third service asset is substituted for the first service asset associated with the first event based on a timing of receipt of the first response to the first substitute request notification.

11. A non-transitory computer-readable storage medium including instructions that when executed by a computer, cause the computer to perform operations comprising, at least:
   storing by the processor a schedule of events and a plurality of service assets in a database, wherein each event in the schedule of events is associated with one of the plurality of service assets, and wherein a first service asset is unable to attend the event;
   detecting by the processor a request from a first computing device associated with the first service asset, wherein the request includes an identification of a first event associated with the first service asset, wherein the first event is included in the schedule of events and the first service asset is included in the plurality of service assets;
   generating, by the processor, a user interface to be displayed on the first computing device, wherein the user interface includes, at least:
   a plurality of selectable items corresponding to the plurality of service assets, respectively,
   a selectable request-substitute interface element,
   a selectable event sign-in interface element;
   receiving, by the processor, first input selecting the request-substitute interface element on the user interface displayed on the first computing device, wherein the first input includes selection of a first selectable item in the plurality of selectable items, and wherein the first selectable item is associated with a second service asset;
   in response to receiving the first input,
   generating a selectable send-request interface element to be displayed in the user interface of the first computing device;
   in response to receiving a selection of the send-request interface element, generating a first substitute request notification to be displayed on a second computing device, wherein the second computing device is associated with the second service asset;
   in response to receiving, from the second computing device, a first response to the first substitute request notification, updating the schedule of events in the database, wherein updating the schedule of events includes:
   substituting in the database the second service asset for the first service asset to associate the first event with the second service asset, and
   generating a second notification to be displayed on a plurality of computing devices, wherein the second notification includes the first event being associated with the second service asset.

12. The non-transitory computer-readable storage medium of claim 11, wherein the operations further comprise:
   in response to receiving, from the second computing device, a second response to the first substitute request notification,
   generating the first substitute request notification to be displayed on a third computing device, wherein the third computing device is associated with a third service asset.

13. The non-transitory computer-readable storage medium of claim 12, wherein the operations further comprise:
   in response to receiving, from the third computing device, a response to the first substitute request notification, updating the schedule of events in the database, wherein updating the schedule of events includes:
   substituting in the database the third service asset for the first service asset to associate the first event with the third service asset, and generating a third notification to be displayed on the plurality of computing devices, wherein the third notification includes the first event being associated with the third service asset.

14. The non-transitory computer-readable storage medium of claim 13, wherein the plurality of selectable service assets is a ranked pool of selectable service assets and the second service asset is selected automatically, based on rank, to receive the first substitute request notification in response to receipt of the second response to the first substitute request notification.

15. The non-transitory computer-readable storage medium of claim 14, wherein the third service asset is substituted for the first service asset associated with the first event based on a timing of receipt of the first response to the first substitute request notification.

* * * * *